United States Patent
Wu et al.

(10) Patent No.: US 6,288,671 B1
(45) Date of Patent: Sep. 11, 2001

(54) BEACON-ASSISTED SPACECRAFT ATTITUDE CONTROL SYSTEMS AND METHODS

(75) Inventors: Yeong-Wei Andy Wu, Rancho Palos Verdes; Umesh S. Ketkar, Torrance; Rongsheng Li, Hacienda Heights; Richard Y. Chiang, RPV, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/557,378

(22) Filed: Apr. 25, 2000

(51) Int. Cl.[7] ................................................. H04B 7/185
(52) U.S. Cl. ........................ 342/357.11; 701/13; 244/164
(58) Field of Search .................................. 342/352, 354, 342/355, 357.11, 462; 701/4, 13; 244/164, 165, 171

(56) References Cited

U.S. PATENT DOCUMENTS

| | | | |
|---|---|---|---|
| 4,963,890 | 10/1990 | Perrotta et al. | 342/359 |
| 5,790,071 | * 8/1998 | Silverstein et al. | 342/354 |
| 5,926,130 | 7/1999 | Werntz | 342/354 |
| 6,018,315 | * 1/2000 | Ince et al. | 342/357.11 |

* cited by examiner

Primary Examiner—Dao Phan
(74) Attorney, Agent, or Firm—T. Gudmestad

(57) ABSTRACT

Control systems and methods are provided which enhance acquisition range, transient response and offset pointing accuracy in beacon-assisted orientation of a spacecraft to a desired spacecraft attitude $A_{dsrd}$. The methods receive a beacon signal with antennas that are arranged in a fixed angular relationship to thereby form an attitude error signal $S_{err}$ whose magnitude is a measure of the attitude difference between a current spacecraft attitude $A_{crnt}$ and the desired spacecraft attitude $A_{dsrd}$. A sum power $P_\Sigma$ that is the sum of the signal powers from the antennas is sensed and a signal modifier $S_{mod}$ is generated that increases with decreases in the sum power $P_\Sigma$. The attitude error signal $S_{err}$ is then modified with a term $(1+S_{mod})$ to form an enhanced attitude error signal $S_{err_{enhd}}$. In one embodiment, the signal modifier $S_{mod}$ is $n|P_{max}-P_\Sigma|^m$ wherein n and m are positive numbers and $P_{max}$ is the sum power $P_\Sigma$ when the attitude error is zero.

20 Claims, 7 Drawing Sheets

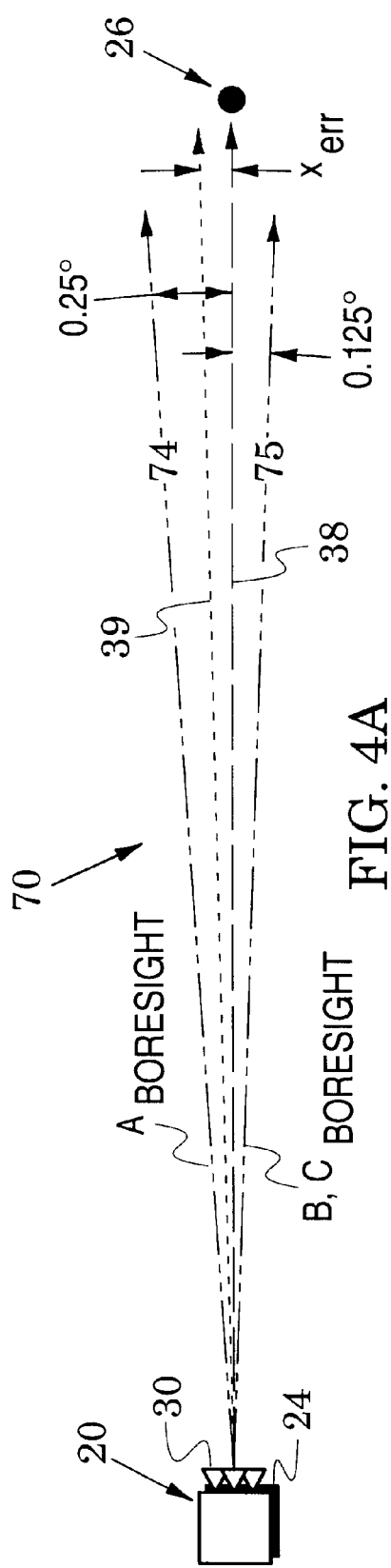
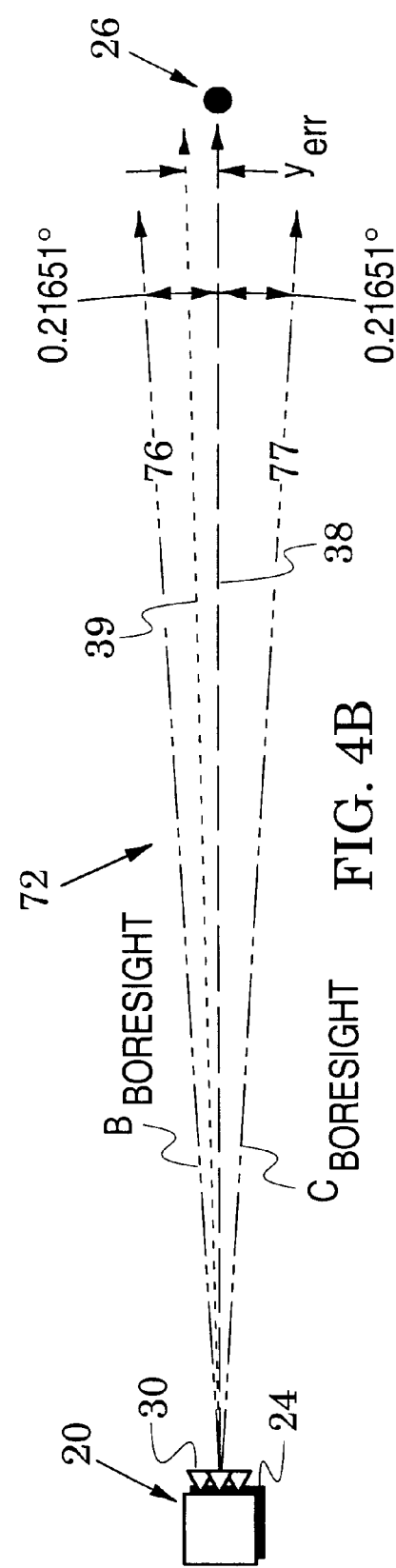
FIG. 4A
FIG. 4B

BEACON-ASSISTED SPACECRAFT
ATTITUDE CONTROL SYSTEMS AND
METHODS

BACKGROUND OF THE INVENTION

1. Field of the Invention

The present invention relates generally to spacecraft attitude control and, more particularly, to beacon-assisted attitude control.

2. Description of the Related Art

Various conventional tracking systems and methods have been described (e.g., see U.S. Pat. Nos. 4,963,890 and 5,926,130) for beacon-assisted spacecraft attitude control. The acquisition range, transient response and offset pointing of these systems and methods, however, has often been found to be less than satisfactory and they typically fail to operate autonomously (i.e., they require assistance from supporting control systems).

SUMMARY OF THE INVENTION

The present invention is directed to the autonomous orientation of a spacecraft to a desired spacecraft attitude $A_{dsrd}$ relative to a beacon that transmits a beacon signal. It discloses attitude control systems and methods which make direct use of received antenna powers and a signal modifier $S_{mod}$ to facilitate autonomous spacecraft attitude control, enhance conventional acquisition ranges and conventional transient responses and facilitate precise offset attitudes. These systems and methods avoid ambiguities that are introduced when received antenna powers are converted to angular distances.

These goals are achieved with process steps that include:
a) providing the spacecraft with at least three antennas A - - - N that have respective boresights arranged in a fixed angular relationship;
b) from the antennas, receiving the beacon signal with power amplitudes $P_A$ - - - $P_N$ that are each a measure of the angular distance between the boresight of a respective one of the antennas A - - - N and the beacon;
c) combining the powers $P_A$ - - - $P_N$ in accordance with the angular relationship to generate at least one attitude error signal $S_{err}$ whose magnitude is a measure of the attitude difference between a current spacecraft attitude $A_{crnt}$ and the desired spacecraft attitude $A_{dsrd}$;
d) generating a signal modifier $S_{mod}$ that increases with decreases in a sum power $P_\Sigma$ that is the sum of the signal powers $P_A$ - - - $P_N$;
e) modifying the attitude error signal $S_{err}$ with a term $(1+S_{mod})$ to form an enhanced attitude error signal $S_{err_{enhd}}$; and
f) orienting the spacecraft to reduce the enhanced attitude error signal $S_{err_{enhd}}$.

In one embodiment, the signal modifier $S_{mod}$ is set equal to $n|P_{max}-P_\Sigma|^m$ wherein n and m are positive numbers and the maximum power $P_{max}$ is the sum power $P_\Sigma$ when the attitude error signal $S_{err}=0$.

Systems and spacecraft are also described for realizing the methods described above.

The novel features of the invention are set forth with particularity in the appended claims. The invention will be best understood from the following description when read in conjunction with the accompanying drawings.

BRIEF DESCRIPTION OF THE DRAWINGS

FIGS. 4A and 4B are side views of the spacecraft and beacon of FIG. 1 that correspond to the coordinate system of FIG. 3;

DETAILED DESCRIPTION OF THE PREFERRED EMBODIMENTS

The present invention is especially suited for enhancing acquisition range, transient response and precision offset pointing in the orientation of a spacecraft to a desired spacecraft attitude $A_{dsrd}$ relative to a beacon that transmits a beacon signal. It achieves spacecraft attitude control via the direct use of received powers from beacon-sensing antennas and via the use of a signal modifier to form enhanced attitude error signals $S_{err_{enhd}}$. Accordingly, it facilitates autonomous spacecraft attitude control (i.e., it removes the need for supporting control systems), enhances conventional acquisition ranges and conventional transient responses and facilitates precise offset attitudes.

Figure 1:
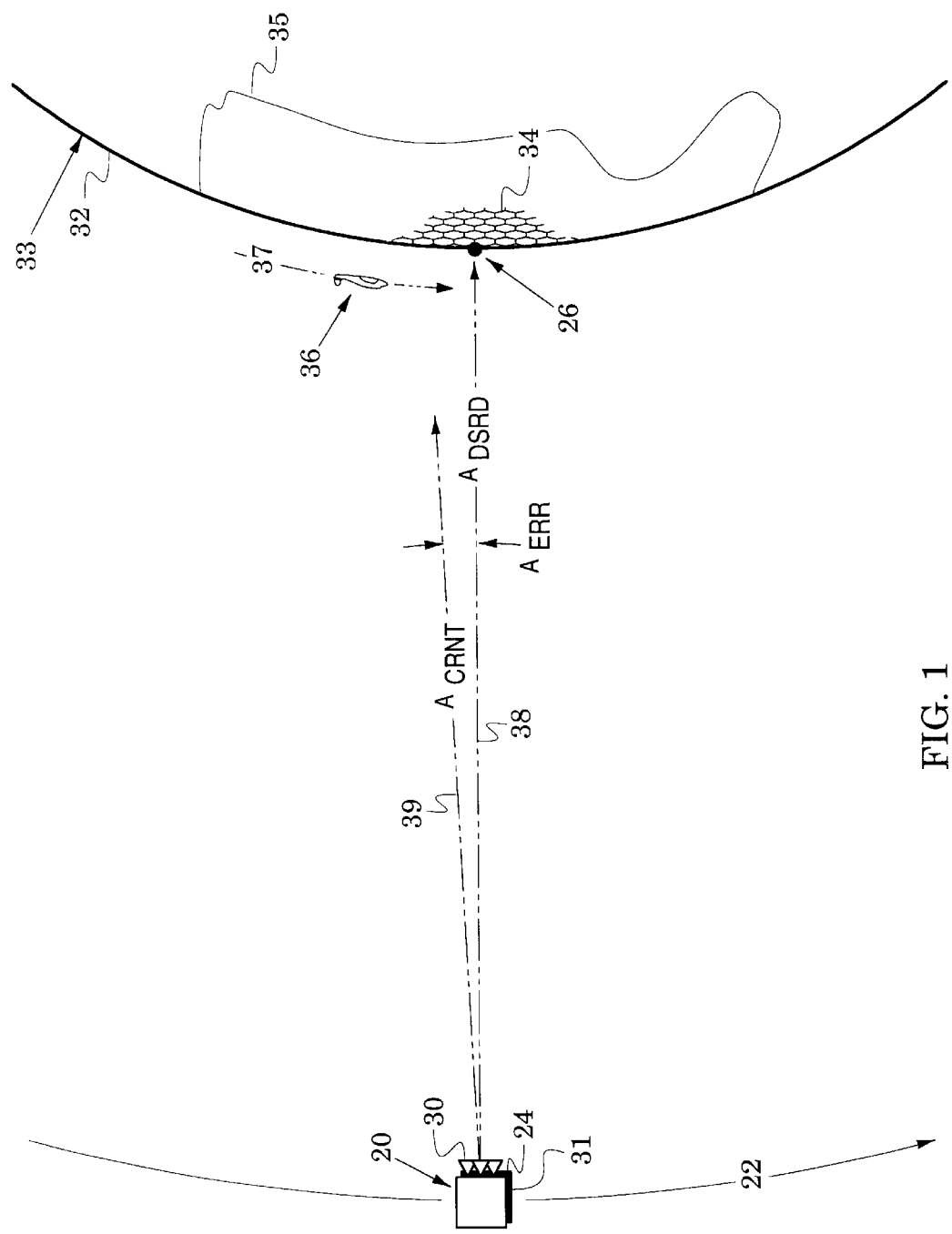
FIG. 1 is a view that illustrates a spatial relationship between a spacecraft, antennas carried by the spacecraft and a beacon that transmits a beacon signal.
Figure 2:
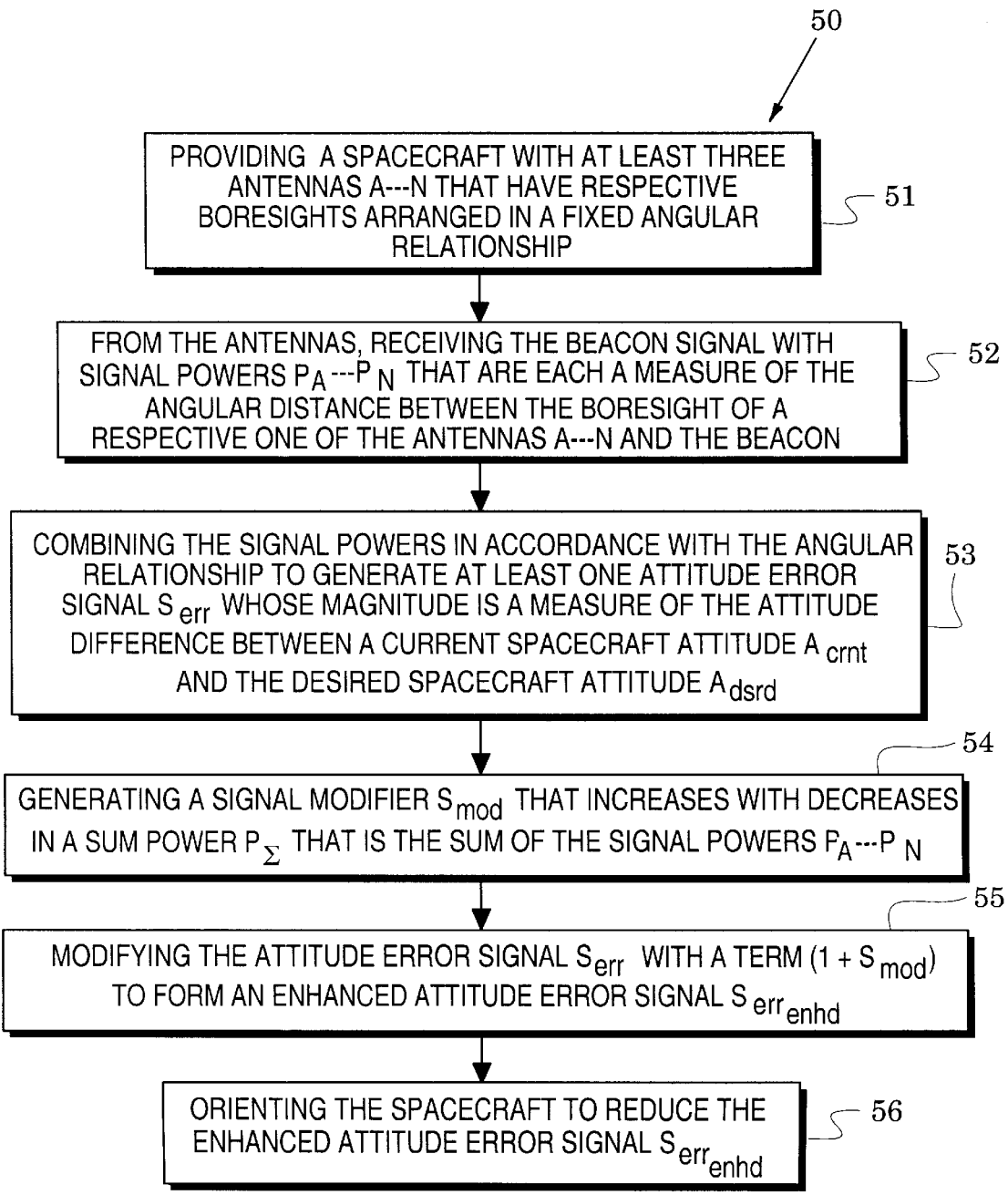
FIG. 2 is a flow chart that recites exemplary process steps of the invention which orient the attitude of the spacecraft of FIG. 1.

Concepts of the invention are illustrated in FIG. 1 which shows the spacecraft and beacon and in FIG. 2 which recites process steps that realize the desired spacecraft attitude $A_{dsrd}$. In particular, FIG. 1 shows a spacecraft 20 traveling in an orbital path 22 and having a spacecraft member (e.g., a face 24) directed towards a beacon 26. The beacon's signal is received in antennas 30 that are carried on the spacecraft body 31 and are arranged in a fixed spatial relationship with each other and with the face 24.

In practicing the invention, the beacon 26 can be positioned in a variety of locations. As a first example, it can be positioned on the surface 32 of an Earth 33 as shown in FIG. 1. As a second example, it can be associated with an array of communication cells 34 in a terrestrial area 35 (e.g., a country) which might originate and receive signals that are routed through the spacecraft 20. As a third example, the beacon 26 may be carried on a vehicle such as the airplane 36 that is traveling along a fight path 37.

In the embodiment illustrated in FIG. 1, the invention aids in orienting the spacecraft 20 so that the face 24 is directed towards the beacon 26. That is, the spacecraft is oriented to have a desired attitude $A_{dsrd}$ as indicated by the vector 38 between the face 24 and the beacon 26. When the spacecraft is instead oriented with a different current attitude $A_{crnt}$ as indicated by the vector 39, it has an attitude error $A_{err}$ that is shown in FIG. 1 to be the difference between the current attitude $A_{crnt}$ and the desired attitude $A_{dsrd}$.

The flow chart 50 of FIG. 2 has a first process step 51 that provides the spacecraft 20 with at least three antennas A - -

- N which have respective boresights arranged in a fixed spatial relationship. An antenna's boresight is its electromagnetic axis and, accordingly, it defines the direction of maximum radiation (when radiating) or maximum sensitivity (when receiving). An exemplary antenna arrangement is shown in the angular plot 60 of FIG. 3. In this embodiment, three antennas A, B and C are provided and arranged to each diverge from a central axis (e.g., the axis 38 of FIG. 1) with an angle of 0.25°.

The chart 60 plots these divergence angles on an exemplary orthogonal x, y coordinate system with the antenna A positioned on the x axis. In the coordinate system of FIG. 3, the 0.25° divergence causes antenna A to have angular components $x_1=-0.25°$, $y_1=0°$ and causes antennas B and C to have respective angular components of $x_2=0.125°$, $y_2=0.21651°$ and $x_3=0.125°$, $y_3=-0.21651°$. These exemplary divergence values indicate that the antennas A, B and C are laterally spaced on the antenna face (24 in FIG. 1) at 120° intervals about the desired attitude vector (38 in FIG. 1).

Figure 3:
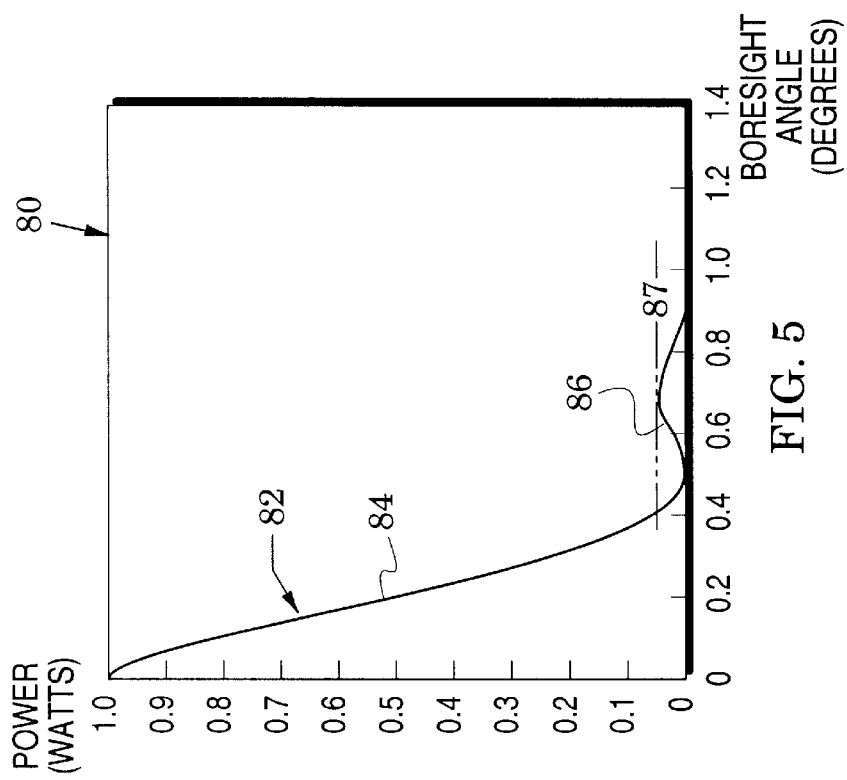
FIG. 3 is chart of angular relationships between the antennas of FIG. 1 wherein the chart is organized along an exemplary coordinate system.

When the spacecraft 20 of FIG. 1 is oriented with the desired attitude $A_{dsrd}$, the beacon 26 will have a position 26A at the origin of the plot 60 of FIG. 3. Accordingly, each antenna A, B and C will have a common angular distance $r_{cm}$ of 0.25° from the beacon 26. When the spacecraft 20 is oriented with a different current attitude (e.g., $A_{crnt}$ in FIG. 1) the beacon 26 will be spaced from the origin of the plot 60. For example, it may then have a position 26B and, from this position, the antennas A, B and C will respectively have angular distances $r_1$, $r_2$ and $r_3$ from the beacon. When in position 26B, the spacecraft attitude will have the attitude errors $x_{err}$ and $y_{err}$ shown in FIG. 3.

The antenna and beacon angular relationships are further illustrated in FIGS. 4A and 4B which indicate corresponding attitude errors $x_{err}$ and $y_{err}$. These are side views 70 and 72 of FIG. 1 that are arranged in accordance with the coordinate system of FIG. 3. That is, FIGS. 4A and 4B respectively view FIG. 1 along the x and y axes of FIG. 3. In these figures, the spacecraft face 24 is initially assumed to be directed along the desired attitude vector 38 to the beacon 26. In FIG. 4A, the boresight 74 of antenna A accordingly forms an angle of 0.25° with the vector 38 and the boresights 75 of antennas B and C form an oppositely directed angle of 0.125°. In FIG. 4B, the boresight of antenna A falls on the vector 38 and the boresights 76 and 77 of antennas B and C form oppositely-directed angles of 0.21651° with the vector 38.

It is apparent in FIG. 4A that if the current spacecraft attitude $A_{crnt}$ were rotated 0.10 to align with the vector 39 (also shown in FIG. 1), then the boresight A angle would increase from 0.25 to 0.35 and the boresight angles B, C would decrease from 0.125° to 0.025°. It is similarly apparent in FIG. 4B that if the current spacecraft attitude $A_{crnt}$ were rotated 0.1° to align with the vector 39, then the boresight B angle would increase from 0.21651° to 0.31651° and the boresight angle C would decrease from 0.21651° to 0.11651°. In these assumed rotations, the spacecraft attitude would have the indicated attitude errors $x_{err}$ and $y_{err}$ (for clarity of illustration, the angles depicted in FIGS. 4A and 4B have been greatly exaggerated).

The angular distances $r_1$, $r_2$ and $r_3$ of FIG. 3 can be detected in the spacecraft 20 of FIG. 1 because the relationship between received beacon power and boresight angle is typically known. An exemplary relationship between received beacon power and boresight angle (angle from the beacon) is given by $$P_r = 2\left(\frac{J_1\left(\frac{\pi D}{\lambda}\sin r_n\right)}{\frac{\pi D}{\lambda}\sin r_n}\right)^2 \quad (1)$$

in which $J_1$ is the Bessel function of the first kind, D is antenna diameter and $\lambda$ is beacon signal wavelength and $r_n$ is the angular distance. This relationship is plotted in FIG. 5 for an antenna diameter of 1.4427 meters and a wavelength of 0.010163 meters. The plot 82 indicates a power minimum at approximately 0.5° boresight angle between a main lobe 84 and a first side lobe 86. It is noted that the plot yields an unambiguous boresight angle only for those angles in which the power in the main lobe 84 exceeds the peak power 87 of the first side lobe 86.

Figure 5:
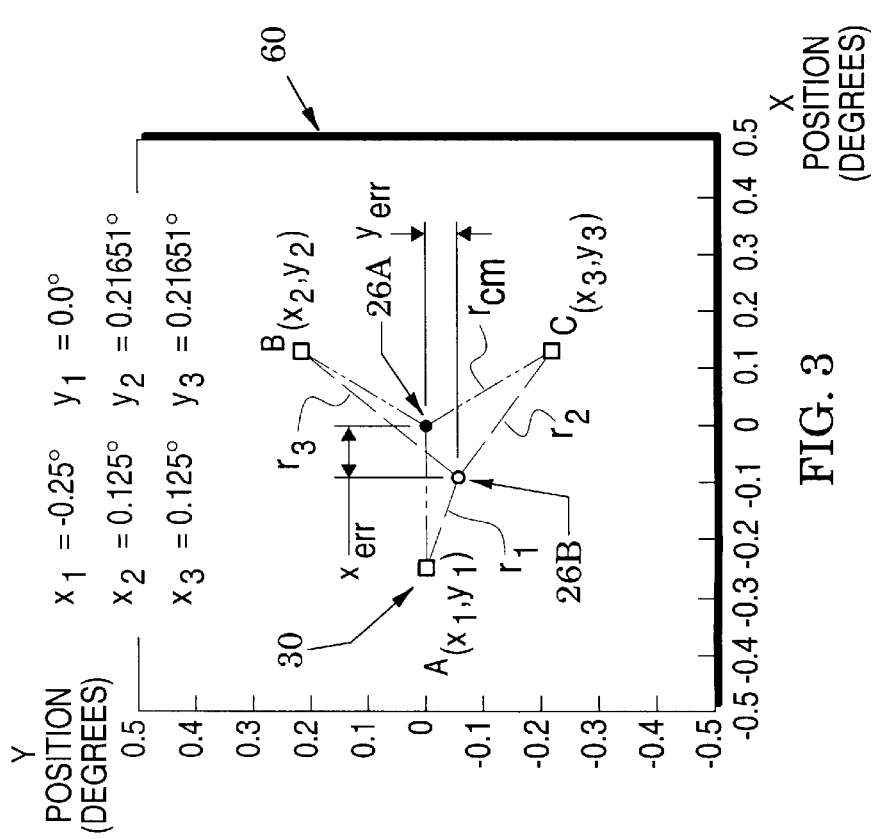
FIG. 5 is a graph that illustrates an exemplary relationship between received power and boresight angle in the antennas of FIG. 1.

Fom the plot 82 of FIG. 5, received power in the antennas 30 of the spacecraft 20 of FIG. 1 can thus be converted to the angular distances $r_1$, $r_2$ and $r_3$ of FIG. 3. From these known angular distances, the attitude errors $x_{err}$ and $y_{err}$ of FIG. 3 can be expressed as $$x_{err} = \frac{1}{2(2x_1 - x_2 - x_3)}(r_2^2 + r_3^2 - 2r_1^2) \quad (2)$$

$$x_{err} = N_{fx}(r_2^2 + r_3^2 - 2r_1^2)$$

$$y_{err} = \frac{1}{2(y_3 - y_2)}(r_2^2 - r_3^2)$$

$$y_{err} = N_{fy}(r_2^2 - r_3^2)$$

in which the terms $N_{fx}$ and $N_{fy}$ are normalization factors based on the angular relationship between the antennas. It can be observed from FIG. 3 that these attitudes are generally formed by adding squares of angular distances that are on a same side of the beacon signal and differencing squares of angular distances that are on different sides of the beacon signal. It is further noted that received antenna powers must be converted to angular distances before these relationships can be used in the generation of attitude-control error signals.

With this background description completed, attention is now returned to the flow chart 50 of FIG. 2 in which process step 52 employs antennas with a known angular relationship to receive a beacon signal with signal powers $P_A$ - - - $P_N$ that are each a measure of the angular distance between the boresight of a respective one of the antennas A - - - N and the beacon. Exemplary details of this step have been described above with reference to FIGS. 3–5.

Process step 53 of FIG. 2 combines the signal powers $P_A$ - - - $P_N$ in accordance with the angular relationship to generate at least one attitude error signal $S_{err}$ whose magnitude is a measure of the attitude difference between a current spacecraft attitude $A_{crnt}$ and the desired spacecraft attitude $A_{dsrd}$. This step differs significantly from the calculated attitude errors $x_{err}$ and $y_{err}$ of equation (2) because it substitutes actual antenna power measurements for the angular distances $r_1$, $r_2$ and $r_3$ which were converted from power measurements with knowledge of the relationship between received beacon power and boresight angle.

The method of FIG. 2 continues with process step 54 which generates a signal modifier $S_{mod}$ that increases with decreases in a sum power $P_\Sigma$ that is the sum of the signal powers $P_A$ - - - $P_N$. In the exemplary antenna set of FIG. 3, the sum power $P_\Sigma$ is the sum of the powers received by antennas A, B and C (i.e., $P_A+P_B+P_C$).

Process step 55 then modifies the attitude error signal $S_{err}$ with a term $(1+S_{mod})$ to form an enhanced attitude error signal $S_{err_{enhd}}$ and process step 56 orients the spacecraft to reduce the enhanced attitude error signal $S_{err_{enhd}}$. In spacecraft attitude control, it has been found that the use of the signal powers $P_A$ - - - $P_N$ significantly enhances acquisition range and the use of the term $(1+S_{mod})$ significantly enhances transient response.

The teachings of these process steps can be practiced with various signal modifier $S_{mod}$ embodiments. One embodiment can be defined with reference to FIG. 6 in which a plot 88 indicates an antenna sum power $P_\Sigma$ as a function of attitude error $A_{err}$. For the antennas of FIG. 3, the sum power $P_\Sigma = P_A + P_B + P_C$ wherein $P_A$, $P_B$ and $P_C$ are the received powers from the antennas A, B and C. As indicated in FIG. 6, a maximum power $P_{max}$ is the maximum value of the sum power $P_\Sigma$ and this maximum power $P_{max}$ is received when the attitude error $A_{err} = 0$.

Figure 6:
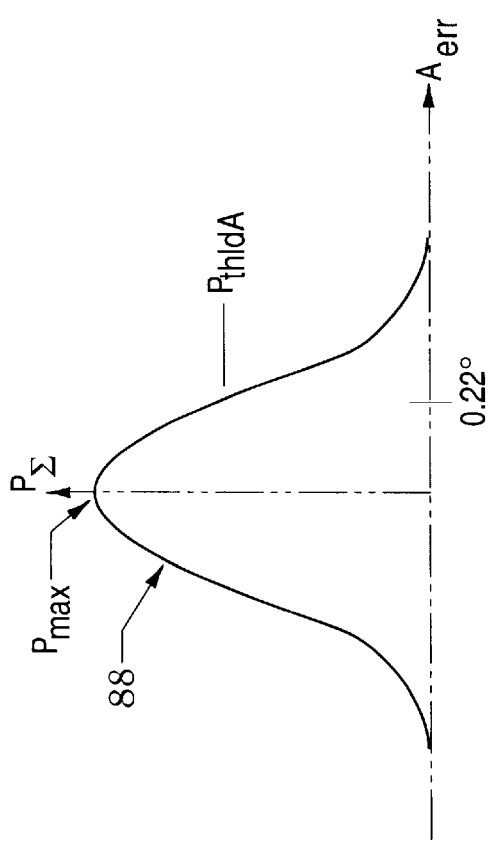
FIG. 6 is a graph of sum power $P_\Sigma$ in the antennas of FIG. 1.

From FIG. 6, it is evident that one embodiment of the signal modifier $S_{mod}$ may be $(P_{max} - P_\Sigma)$ which obviously increases as $P_\Sigma$ decreases in response to greater attitude errors. More generally, the signal modifier $S_{mod}$ may be chosen to be $n|P_{max} - P_\Sigma|^m$ in which n and m are positive numbers and the quantity $(P_{max} - P_\Sigma)$ is replaced by its absolute value. Although $(P_{max} - P_\Sigma)$ will always be positive or zero in FIG. 6, this replacement accommodates offset method embodiments which will presently be described.

With this general embodiment of the signal modifier $S_{mod}$, and with reference to the specific coordinate system of FIG. 3, enhanced attitude error signals $S_{xerr}$ and $S_{yerr}$ may be defined as $$S_{xerr_{enhd}} = \alpha N_{fx}\{1+n|P_{max}-P_\Sigma|^m\}(P_B+P_C-2P_A) \quad S_{yerr_{enhd}} = \alpha N_{fy}\{1+n|P_{max}-P_\Sigma|^m\}(P_B-P_C) \qquad (3)$$

in which the symbol $\alpha$ is a conversion factor that converts received power to a respective detected voltage signal, $N_{fx}$ and $N_{fy}$ are the normalization factors of equations (2) and the antenna powers $P_A$, $P_B$ and $P_C$ have been combined in a mannner that corresponds to the combining of the converted angular distances in equations (2). In an exemplary embodiment in which received power of one watt produces a detected signal of 5 volts, the antennas diverge at 0.250 and $P_{0.25}$ represents received power from an antenna whose boresight error is 0.25°, the conversion factor $\alpha$ equals $0.25^2/(5-P_{0.25})$.

Figure 7:
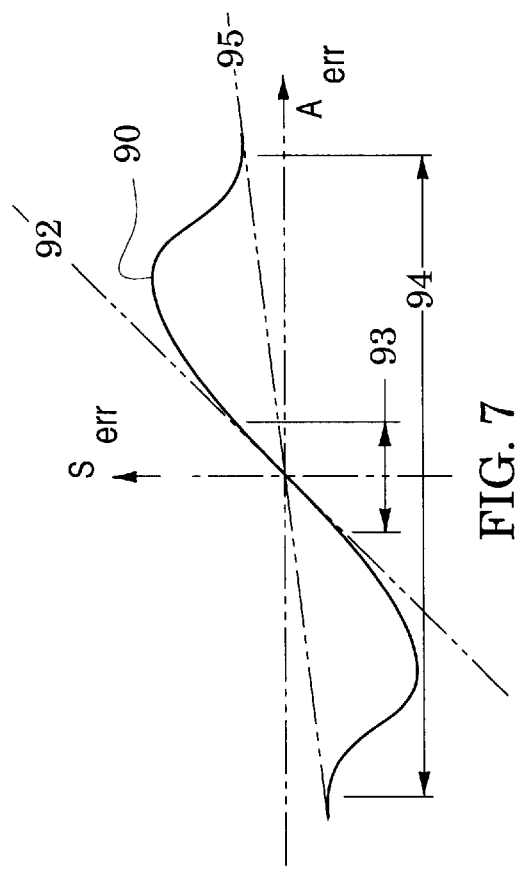
FIG. 7 is a graph of a transfer function which plots attitude error signal $S_{err}$ versus attitude error $A_{err}$, the graph illustrates an enhanced acquisition range that is realized with the process steps of FIG. 2.

FIG. 7 illustrates an exemplary attitude-control transfer function 90 that relates attitude error signal $S_{err}$ as a function of attitude error $A_{err}$. The transfer function has an initial instantaneous slope 92 when the atttidude error is zero and approximates this initial slope over a limited attitude range 93. Because they use converted angular distances, the attitude errors of equations (2) are substantially true only in the limited attitude range 93. Accordingly their use in an attitude control system will insure control acquisition only over this same limited range.

In contrast, it has been found that the combination of antenna power combinations (e.g., $P_B+P_C-2P_A$) of equations (3) are effective over any expanded attitude range 94 in which the instantaneous slope of the transfer function has a slope greater than zero as exemplarized by the slope 95. Accordingly, use of the attitude error signals of equations (3) will provide control acquisition over the substantially-enlarged attitude range 94.

The limited attitude range 93 of FIG. 6 basically corresponds to a boresight angle of ~0.4° in FIG. 5 which is the lowest power point for which the plot 82 yields an unambiguous conversion from received power to boresight angle. The angular plot 60 of FIG. 3 has been duplicated in FIGS. 8A and 8B with unambiguous circles 110 of radius 0.4° centered over antennas A, B and C in FIG. 8A. Controlling attitude with equations (2) is thus limited to an acquisition range defined by the shaded intersection 111 of the unambiguous circles 110.

Figure 8B:
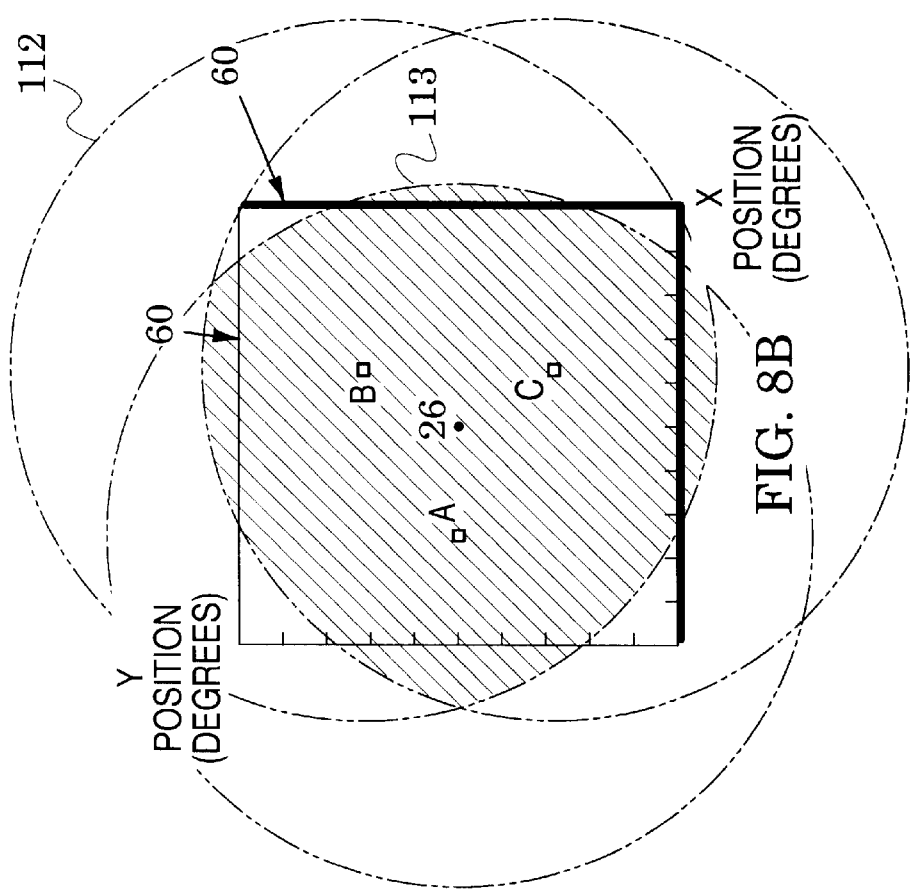
FIGS. 8A and 8B use the chart of FIG. 3 to further illustrate the enhanced acquisition range of FIG. 6.
Figure 8A:
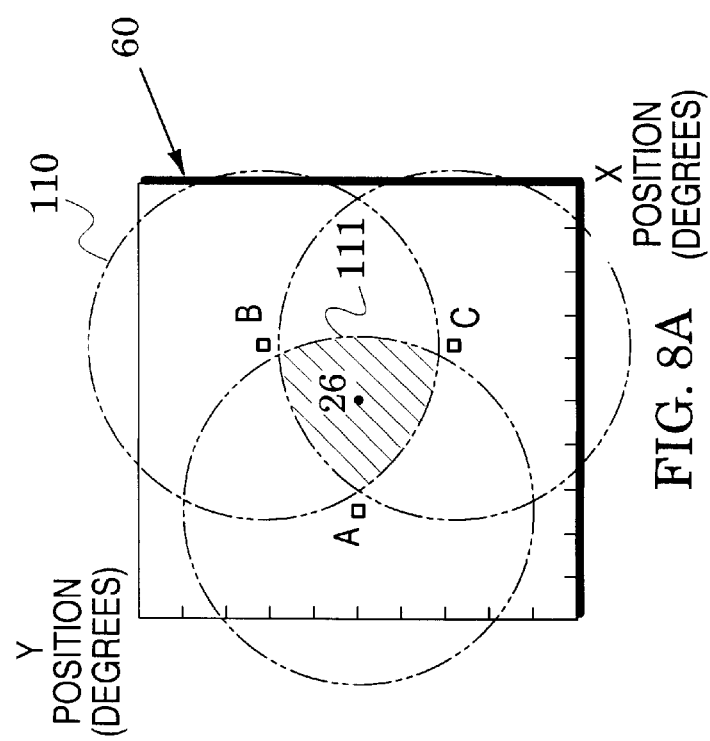

In contrast, the expanded attitude range 94 of FIG. 7 basically extends past the first side lobe 84 of FIG. 5 to a boresight angle of ~0.8°. Corresponding unambiguous circles 112 are shown in FIG. 8B which indicates that the shaded intersection 111 of FIG. 8A has significantly expanded to a shaded intersection 113. As described above, increased boresight angles (e.g., angles that exceed ~0.4° in FIG. 5) introduce ambiguities when antenna power is converted to angular distances. Direct use of antenna powers (e.g., as shown in equations (3)) avoid these ambiguities.

The general signal modifier $n|P_{max}-P_\Sigma|^m$ of equations (3) is particularly effective in enhancing transient response during spacecraft attitude control. An exemplary use of this term can be shown with reference to an arbitrary power threshold $P_{thldA}$ that is positioned at an attitude error of ~0.226° in the plot 100 of sum power $P_\Sigma$ in FIG. 6. In this exemplary use, n and m are chosen such that the signal modifier is $2|P_{max}-P_\Sigma|^2$ when the sum power $P_\Sigma$ is less than the power threshold $P_{thldA}$ and is $2|P_{max}-P_\Sigma|$ when the sum power $P_\Sigma$ is greater than the power threshold $P_{thldA}$. Thus, the attitude error signals of equations (3) are increased when attitude error is large so as to reduce acquisition time but are decreased as attitude error diminishes so as to reduce control overshoot and/or ringing.

Obviously, the selection of n and m can be varied in many ways to condition transient response parameters (e.g., acquisition time, undershoot, overshoot and ringing). Additionally, they can be chosen with respect to more than one power threshold in the sum power $P_\Sigma$ plot 100 of FIG. 6 to facilitate further control over the transient response parameters.

With reference to the plot 88 of sum power $P_\Sigma$ in FIG. 6, it can be seen that the value of the general signal modifier $n|P_{max}-P_\Sigma|^m$ approaches zero as the attitude error $A_{err}$ approaches zero. Thus the term $\{1+n|P_{max}-P_\Sigma|^m\}$ approaches 1 as the attitude error $A_{err}$ approaches zero, i.e., the effect of the signal modifier diminishes as the spacecraft attitude error is reduced to very small values.

Figure 9:
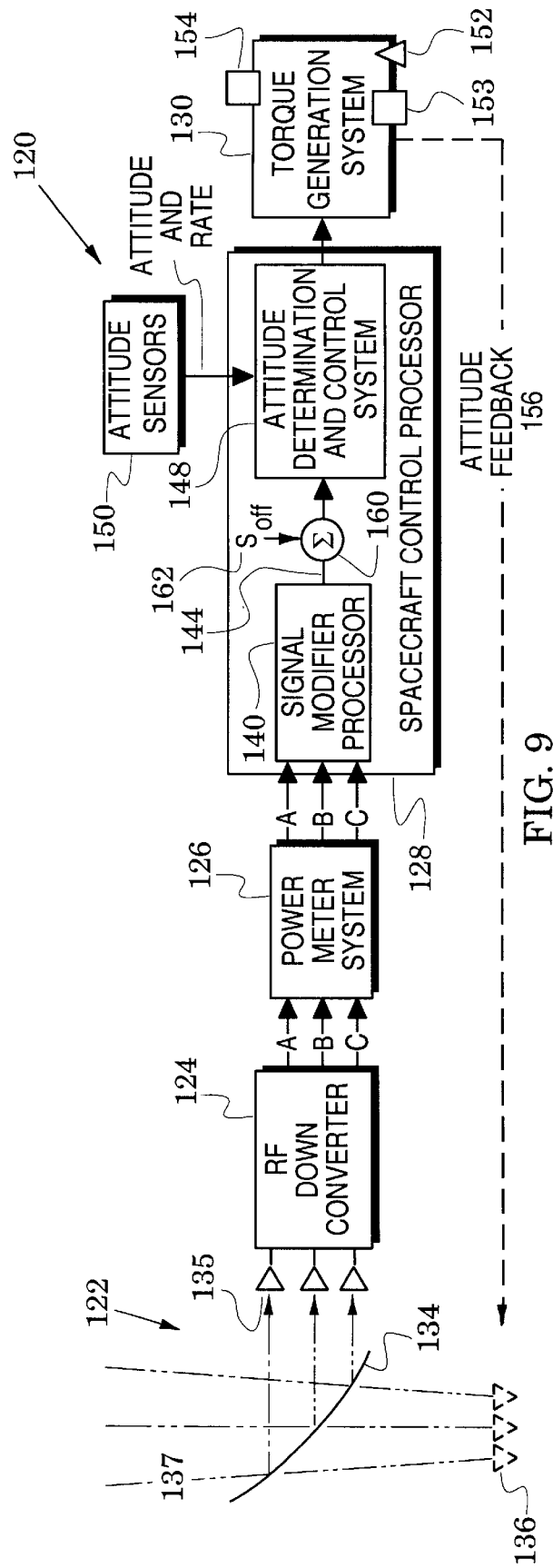
FIG. 9 is a block diagram of a control system of the invention that realizes the process steps of FIG. 2.

The process steps of FIG. 2 can be realized with the control system 120 of FIG. 9 which includes an antenna system 122, an RF downconverter 124, a power measurement device such as the power meter system 126, a spacecraft control processor 128 and a torque generation system 130. The antenna system 122 can be formed, for example, with a reflector 134 that directs a beacon signal (from the beacon 26 of FIG. 1) to feed horns 135. The reflector 134 causes the horns 135 to appear to be in virtual positions 136 from which it is seen they are arranged in an angular relationship that causes their boresights 137 to diverge.

After the received signals are downconverted in the downconverter 124, they are measured in the power meter system 126 and provided directly (i.e., without conversion to angular distances) to the spacecraft control processor 128. A processor 140 within the spacecraft control processor may be programmed to perform the process steps 53, 54 and 55 of FIG. 2 (when programmed, such process steps are sometimes referred to as procedures or algorithms). The processor 140 thus receives the power signals (e.g., from antennas A, B and C) and, in response, forms an attitude error signal $S_{err}$ and modifies this to an enhanced attitude error signal $S_{err_{enhd}}$ 144.

The spacecraft control processor 128 includes an attitude determination and control system 148 which receives the enhanced attitude error signal $S_{err_{enhd}}$ along with attitude and attitude rate signals from attitude sensors 150 (e.g., earth sensors, sun sensors and rate gyros). From these input signals, the attitude determination and control system 148 uses conventional feedback transfer functions (e.g., proportional plus derivative signals) and spacecraft dynamics transfer functions to generate control signals which are coupled to the torque generation system 130. This latter system includes conventional torque generators (e.g., thrusters 152, momentum wheels 153 and magnetic torquers 154) which respond to the control signals by effecting spacecraft attitude changes that act as an attitude feedback 156 that is sensed by the antenna system 122.

The systems and methods of the invention can be modified to direct the vector 38 of FIG. 1 to a spatial point that is offset from the beacon 26. This is effected in the control system 120 of FIG. 9 by passing the enhanced attitude error signal $S_{err_{enhd}}$ through a summer 160 which is biased with an appropriate offset signal $S_{off}$ 162. Completing the process steps of FIG. 2 will then cause the spacecraft 20 of FIG. 1 to be directed along the desired offset vector.

Insertion of the offset signal 162 (and the resultant offset pointing) introduces asymmetries into the profile of the sum power $P_\Sigma$ plot 88 of FIG. 6. For offset pointing, it has therefore been found that acquisition range can be further improved if the enhanced attitude error signals $S_{err_{enhd}}$ recited above as equations (3) are modified to ones better suited to accommodate the offset-induced asymmetries. For the exemplary coordinate system of FIG. 3, the offset signal $S_{off}$ would be expressed as $x_{off}$ and $y_{off}$ and an exemplary set of modified enhanced attitude error signals are given by $$S_{xerr_{enhd}} = N_{fx}\{1+n|P_{max_{off}}-P_\Sigma|^m\}(\alpha_2 P_B+\alpha_3 P_C-2\alpha_1 P_A-P_X)\ S_{yerr_{enhd}} = N_{fy}\{1+n|P_{max_{off}}-P_\Sigma|^m\}(\alpha_2 P_B-\alpha_3 P_C-P_Y) \quad (4)$$

wherein $$P_{max_{off}} = P_{A_{r_1=r_A}} + P_{B_{r_2=r_B}} + P_{C_{r_3=r_C}},$$

$$P_X = 5(\alpha_2+\alpha_3-2\alpha_1) \text{ and } P_Y = 5(\alpha_2-\alpha_3)$$

and wherein $\alpha$ factors and angular distances $r_N$ are expressed as:

$$\alpha_1 = \frac{r_A^2}{5-P_{A_{r_1=r_A}}},\ \alpha_2 = \frac{r_B^2}{5-P_{B_{r_2=r_B}}} \text{ and } \alpha_3 = \frac{r_C^2}{5-P_{C_{r_3=r_C}}} \text{ and }$$

$$r_A = \sqrt{((x_1-x_{off})^2+(y_1-y_{off})^2)},\ r_B = \sqrt{((x_2-x_{off})^2+(y_2-y_{off})^2)}$$

and $r_C = \sqrt{((x_3-x_{off})^2+(y_3-y_{off})^2)}$.

In equations (4), $P_X$ and $P_Y$ are power modifiers which enhance the precision of offset pointing because they provide offset corrections that improve the accuracy of the summed and differenced antenna powers $P_A$, $P_B$ and $P_C$. As the offset pointing is reduced to zero, it can be seen that equations (4) reduce to equations (3). In particular $P_X$ and $P_Y$ reduce to zero because $r_1$, $r_2$ and $r_3$ are then equal and, accordingly, $\alpha_1$, $\alpha_2$ and $\alpha_3$ are also equal. Because of the offset of the antennas, the term $P_{max_{of}}-P_\Sigma$ in equations (4) will not always be positive and, accordingly, the absolute value of this term was introduced above in equations (3).

It was mentioned above that the beacon 26 of FIG. 1 can be positioned in various locations to thereby assist in attitude control of spacecraft and, in particular, it can be associated with the array of communication cells 32. The teachings of the invention can be practiced, for example, by placing the beacon at (or offset from) the common intersection of three communication cells (e.g., a point sometimes referred to as the triple cross-over point). In this embodiment, each of the antennas A, B and C of FIG. 3 may be directed to transmit signals to and receive signals from respective one of the three cells.

Systems and methods have been described which make direct use of received antenna powers and a signal modifier $S_{mod}$ to facilitate autonomous spacecraft attitude control, enhance conventional acquisition ranges and conventional transient responses and facilitate precise offset attitudes. These systems and methods avoid ambiguities that are introduced when received antenna powers are converted to angular distances.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of orientating a spacecraft to a desired spacecraft attitude $A_{dsrd}$ relative to a beacon that transmits a beacon signal, the method comprising the steps of:

providing said spacecraft with at least three antennas A - - - N that have respective boresights arranged in a fixed angular relationship;

from said antennas, receiving said beacon signal with signal powers $P_A$ - - - $P_N$ that are each a measure of the angular distance between the boresight of a respective one of said antennas A - - - N and said beacon;

combining said signal powers $P_A$ - - - $P_N$ in accordance with said angular relationship to generate at least one attitude error signal $S_{err}$ whose magnitude is a measure of the attitude difference between a current spacecraft attitude $A_{crnt}$ and said desired spacecraft attitude $A_{dsrd}$;

generating a signal modifier $S_{mod}$ that increases with decreases in a sum power $P_\Sigma$ that is the sum of said signal powers $P_A$ - - - $P_N$;

modifying said attitude error signal $S_{err}$ with a term $(1+S_{mod})$ to form an enhanced attitude error signal $S_{err_{enhd}}$;

and orienting said spacecraft to reduce said enhanced attitude error signal $S_{err_{enhd}}$.

2. The method of claim 1, wherein said providing step includes the step of forming each of said antennas with a horn that is positioned to receive said beacon signal after reflection from a reflector.

3. The method of claim 1, further including the step of limiting said antennas to three antennas A, B and C.

4. The method of claim 1, wherein said combining step includes the steps of:

adding signal powers of antennas whose boresights are substantially on the same side of said beacon; and differencing signal powers of antennas whose boresights are substantially on different sides of said beacon.

5. The method of claim 4, further including the steps of:

determining said same side and said different sides along different first and second axes x and y through said beacon; and thereby causing said attitude error signal $S_{err}$ to comprise first and second attitude error signals $S_{err_x}$ and $S_{err_y}$ along respective said first and second orthogonal axes x and y.

6. The method of claim 1, wherein said generating step includes the step of choosing said signal modifier to be $n|P_{max}-P_\Sigma|^m$ wherein n and m are positive numbers and maximum power $P_{max}$ is said sum power $P_\Sigma$ when said attitude error signal $A_{err}=0$.

7. The method of claim 6, further including the steps of:
   selecting a threshold level $P_{thld}$ of said sum power $P_\Sigma$ that is less than said maximum power $P_{max}$;
   setting n and m to first and second selected values when said sum power $P_\Sigma$ is less than said threshold level $P_{thld}$; and
   setting n and m to third and fourth selected values when said sum power $P_\Sigma$ exceeds said threshold level $P_{thld}$.

8. The method of claim 1, further including the step of combining said attitude error signal $S_{err}$ with an offset signal $S_{off}$ to thereby cause said desired spacecraft attitude $A_{dsrd}$ to include a spatial offset from said beacon.

9. The method of claim 8, further including the step of subtracting a power modifier from said signal powers $P_A$ - - - $P_N$ to facilitate realization of said spatial offset.

10. The method of claim 1, wherein said spacecraft has a selected member and said antennas are arranged about said member to thereby direct said member towards said beacon.

11. An attitude control system that orients a spacecraft to a desired spacecraft attitude $A_{dsrd}$ relative to a beacon that transmits a beacon signal, the system comprising:
   at least three antennas A - - - N that have respective boresights arranged with a fixed angular relationship, said antennas thus arranged to receive said beacon power with signal powers $P_A$ - - - $P_N$ that are each a measure of the angular distance between the boresight of a respective one of said antennas A - - - N and said beacon;
   a downconverter that. downconverts received signals of said antennas; and
   a control processor that responds to said downconverter and:
      a) combines said signal powers $P_A$ - - - $P_N$ in accordance with said angular relationship to generate at least one attitude error signal $S_{err}$ whose magnitude is a measure of the attitude difference between a current spacecraft attitude $A_{crnt}$ and said desired spacecraft attitude $A_{dsrd}$;
      b) generates a signal modifier $S_{mod}$ that increases with decreases in a sum power $P_\Sigma$ that is the sum of said signal powers $P_A$ - - - $P_N$;
      c) modifies said attitude error signal $S_{err}$ with a term $(1+S_{mod})$ to form an enhanced attitude error signal $A_{err_{enhd}}$; and
      d) couples said enhanced attitude error signal $A_{err_{enhd}}$ to said torque-generation system.

12. The system of claim 11, wherein said antennas are limited to three antennas A, B and C.

13. The system of claim 11, wherein said control processor forms said attitude error signal $S_{err}$ as $n|P_{max}-P_\Sigma|^m$ wherein n and m are positive numbers and maximum power $P_{max}$ is said sum power $P_\Sigma$ when said attitude error signal $A_{err}=0$.

14. The system of claim 13, wherein said control processor:
   selects a threshold level $P_{thld}$ of said sum power $P_\Sigma$ that is less than said maximum power $P_{max}$;
   sets n and m to first and second selected values when said sum power $P_\Sigma$ is less than said threshold level $P_{thld}$; and
   sets n and m to third and fourth selected values when said sum power $P_\Sigma$ exceeds said threshold level $P_{thld}$.

15. The system of claim 11, further including the step of combining said attitude error signal $S_{err}$ with an offset signal $S_{off}$ to thereby cause said desired spacecraft attitude $A_{dsrd}$ to include a spatial offset from said beacon.

16. A spacecraft having an attitude control system that orients a spacecraft to a desired spacecraft attitude $A_{dsrd}$ relative to a beacon that transmits a beacon signal, the spacecraft comprising:
   a spacecraft body;
   at least three antennas A - - - N carried on said body and arranged with a fixed angular relationship, said antennas thus arranged to receive said beacon power with signal powers $P_A$ - - - $P_N$ that are each a measure of the angular distance between the boresight of a respective one of said antennas A - - - N and said beacon;
   a downconverter carried in said body to downconvert said signal powers;
   a power measurement system carried in said body to generate signal amplitudes $P_A$ - - - $P_N$ in response to downconverted signal powers $P_A$ - - - $P_N$ from said downconverter;
   a control processor that responds to said downconverter and:
      a) combines said signal amplitudes $S_A$ - - - $S_N$ in accordance with said angular relationship to generate at least one attitude error signal $S_{err}$ whose magnitude is a measure of the attitude difference between a current spacecraft attitude $A_{crnt}$ and said desired spacecraft attitude $A_{dsrd}$;
      b) generates a signal modifier $S_{mod}$ that increases with decreases in a sum power $P_\Sigma$ that is the sum of said signal powers $P_A$ - - - $P_N$;
      c) modifies said attitude error signal $S_{err}$ with a term $(1+S_{mod})$ to form an enhanced attitude error signal $A_{err_{enhd}}$; and
      d) couples said enhanced attitude error signal $A_{err_{enhd}}$ to said torque-generation system.

17. The spacecraft of claim 16, wherein said antennas are limited to three antennas A, B and C.

18. The spacecraft of claim 16, wherein said control processor forms said attitude error signal $S_{err}$ as $n|P_{max}-P_\Sigma|^m$ wherein n and m are positive numbers and maximum power $P_{max}$ is said sum power $P_\Sigma$ when said attitude error signal $A_{err}=0$.

19. The spacecraft of claim 18, wherein said control processor:
   selects a threshold level $P_{thld}$ of said sum power $P_\Sigma$ that is less than said maximum power $P_{max}$;
   sets n and m to first and second selected values when said sum power $P_\Sigma$ is less than said threshold level $P_{thld}$; and
   sets n and m to third and fourth selected values when said sum power $P_\Sigma$ exceeds said threshold level $P_{thld}$.

20. The spacecraft of claim 19, further including the step of combining said attitude error signal $S_{err}$ with an offset signal $S_{off}$ to thereby cause said desired spacecraft attitude $A_{dsrd}$ to include a spatial offset from said beacon.

* * * * *